United States Patent
Dudemaine et al.

(10) Patent No.: US 6,195,634 B1
(45) Date of Patent: Feb. 27, 2001

(54) SELECTION OF DECOYS FOR NON-VOCABULARY UTTERANCES REJECTION

(75) Inventors: Martin Dudemaine, Laval; Claude Pelletier, Brossard, both of (CA)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 08/997,823

(22) Filed: Dec. 24, 1997

(51) Int. Cl.[7] .............................. G10L 15/00; G10L 15/06
(52) U.S. Cl. ..................... 704/231; 704/239; 704/243; 704/251
(58) Field of Search ..................... 704/231, 246, 704/247, 248, 249, 250, 270, 256, 240, 251, 243, 257, 239

(56) References Cited

U.S. PATENT DOCUMENTS

| | | | |
|---|---|---|---|
| 4,802,231 | 1/1989 | Davis | 382/34 |
| 4,896,358 * | 1/1990 | Bahler et al. | 704/257 |
| 5,097,509 | 3/1992 | Lennig | 381/43 |
| 5,218,668 * | 6/1993 | Higgins et al. | 704/200 |
| 5,488,652 * | 1/1996 | Bielby et al. | 704/231 X |
| 5,509,104 | 4/1996 | Lee et al. | 395/2.65 |
| 5,633,985 * | 5/1997 | Severson et al. | 704/267 |
| 5,644,680 * | 7/1997 | Bielby et al. | 704/240 |
| 5,649,057 | 7/1997 | Lee et al. | 395/2.65 |
| 5,675,704 * | 10/1997 | Juang et al. | 704/246 |

* cited by examiner

*Primary Examiner*—Richemond Dorvil
*Assistant Examiner*—Abul K. Azad

(57) ABSTRACT

Assessing decoys for use in an audio recognition process for identifying predetermined sounds in an unknown input audio signal, involves a test recognition process for matching known training audio signals to models representing the predetermined sounds and the decoys and determining for each of the decoys, from the results of the test recognition process, a score representing the effect of the respective decoy in the recognition of any of the known training audio signals. An advantage arising from generating scores for decoys is that the chance of a poor selection of decoys can be reduced. Thus the possibility of poor recognition performance arising from poorly selected decoys can be reduced. Furthermore, the requirement for expert input into the decoy creation process, which may be time consuming, can be reduced. This can make it easier, or quicker, or less expensive to install.

9 Claims, 15 Drawing Sheets

FIG. 10

RECOGNITION LOG 180

|  | TOKENS IN TRAINING LIST: | | |
|---|---|---|---|
|  | 1 | 2 | 3... |
| IN DICTIONARY, (OR IMPOSTER). | Y | N | Y |
| ORTHOGRAPHY (TEXT LABEL, PROPERTIES...) | CALL | KYF | MINE |
| MATCH FROM TEST RECOGNITION | 1: DCOY4 \<KRL> SCORE-20 | 1:DCOY78 \<GEF> | . . . |
| NEXT CLOSEST MATCH | 2: DCOY9 \<OLW> SCORE-30 | . . | . . |
| . . | . | . | . |
| "N"TH CLOSEST MATCH | . | . | . |

FIG.12

DETERMINE A SCORE FOR EACH
OF THE "S" DECOYS, BASED ON
"S" AND "K"    630

SCORE = (S-K+0.5)/S^2    710

INCREMENT "BAD" SCORE IF THE DECOY IS ONE OF SEVERAL DECOYS BETTER MATCHED THAN THE BEST, AND CORRECT, VOCAB WORD  720

INCREMENT "ES_BAD" SCORE IF THE DECOY IS THE ONLY DECOY BETTER MATCHED THAN THE BEST, AND CORRECT, VOCAB WORD  730

INCREMENT "GOOD" SCORE IF THE DECOY IS ONE OF SEVERAL DECOYS BETTER MATCHED THAN THE BEST, BUT INCORRECT, VOCAB WORD  740

INCREMENT "ES_GOOD" SCORE IF THE DECOY IS THE ONLY DECOY BETTER MATCHED THAN THE BEST, BUT INCORRECT, VOCAB WORD  750

WORD RECOGNITION (BY VITERBI ALGORITHM) 54

INPUT WORD AS A SERIES OF OBSERVATIONS IN FORM OF CEPSTRAL VECTORS, AND PRECALCULATE MAHALANOBIS DISTANCES  20

COMPARISON STEP
FOR CURRENT OBSERVATION IN SERIES, COMPUTE PROBABILITY OF IT BEING THE SAME AS EACH PATH IN THE STORED HMM TRELLIS  21

LOOP 1

LOOP 2

REPEAT FOR NEXT HMM UNTIL END  22

REPEAT FOR NEXT OBSERVATION UNTIL END  23

OUTPUT SCORES FOR BEST MATCHING WORDS

FIG. 15    PRIOR ART

TO END STATE OR NEXT HMM

SELECTION OF DECOYS FOR NON-VOCABULARY UTTERANCES REJECTION

BACKGROUND TO THE INVENTION

1. Field of the Invention

The invention relates to methods of assessing decoys for use in an audio recognition process, to methods of audio recognition for identifying predetermined sounds in an unknown input audio signal, using decoys, to apparatus and to software for such methods.

2. Background Art

It is known to perform pattern matching such as speech recognition, using steps of:

1) matching an unknown input against a number of models of known speech, (a lexicon)
2) classifying the results (termed tokens), e.g. determining if the closest match is likely to be correct, with or without a positive rejection step.

Classifying recognition results without rejection is usually simple—the recognizer's top choice is either correct or wrong. With rejection, things are a little more complicated. Rejection attempts to detect when the recognition result is incorrect, either because the person said something that is outside the lexicon or because the recognizer has made an error. If the person has said something that is outside the lexicon, the utterance is called a non-vocabulary utterance, referred to herein at times as an imposter utterance. For example, a typical speech recognition application could have about 10% non-vocabulary utterances, which means that 10% of the time, the person says something that is not in the recognizer's vocabulary. The result, after rejection, is classified as one of:

- correct acceptance (CA): The recognizer's top choice will lead to performing the correct action, and the rejection algorithm accepts the result (note that this does not mean that the recognizer has gotten every word correct, but just that it has gotten all the important ones correct. For example, in the locality task, it has gotten the locality correct but may have the wrong prefix or suffix).
- false acceptance (FA): The top choice is incorrect, either because of a recognition error, or because the token is a non-vocabulary utterance but is not rejected.
- correct rejection (CR): The token is an imposter and it is rejected.
- false rejection (FR): The token is not a non-vocabulary utterance, but it is rejected (note that if the top choice of the recognizer is wrong, the rejection algorithm is correct to reject the result, but it is still referred to as a false rejection because the notion of correct and false are relative to what the speaker intended, and not the recognizer).

The other commonly used term is "forced choice accuracy," which refers to the number of times the recognizer's top choice is correct, without considering rejection. The maximum value for forced choice accuracy is 100% minus the non-vocabulary utterance rate. The forced choice accuracy is the maximum possible value for CA, which occurs when the rejection algorithm accepts all correct recognitions. Typically, however, a (hopefully) small percentage of the correct recognitions are rejected, so that CA is less (typically, on the order of 10%) than the forced choice accuracy.

Classification of a token as a CR or FR is sometimes altered by the definition of a non-vocabulary utterance, because of the notion of word spotting. The goal of a true word-spotting system is to pick out the important words, regardless of what the speaker may say before, between, or after them. Technically, if a person says something with a valid core, but an invalid prefix or suffix (where invalid means it is not in the supported prefix or suffix), the token is a non-vocabulary utterance. In the past, such a token has been considered correctly accepted if the recognizer gets the core right, but also correctly rejected if the token is rejected. To be consistent, one definition should be used, and the trend is towards considering a token to be a non-vocabulary utterance only if it does not have a core, or the core is outside of the supported vocabulary, since the goal is towards having a true word-spotting system. More precisely, the goal is to improve the automation rate, which is achieved by having a recognizer which gets all the important words correct, and realizes when it has made an error on an important word.

Rejection using decoys is known, for example from U.S. Pat. No. 5,097,509 (Lennig). Some non-vocabulary utterances may occur much more frequently than others. For example, non-vocabulary utterance tokens could be "Hello", "Ah", or nothing but telephone noise (the person said nothing at all, but there was enough noise on the line so that the end-pointer did not detect the lack of speech). The most effective way to reject these tokens is to use decoys. A decoy is simply a model for the non-vocabulary utterance that is added to the recognizer's lexicon. If a decoy is the top choice returned by the recognizer, the token is rejected, regardless of the result of any classification algorithm.

However, it is possible that decoys can reduce the effectiveness or speed of the classification, if they produce close matches to utterances that are within the vocabulary. Accordingly decoys need to be carefully selected to suit the application, or the lexicon. This task requires expert input and may be time consuming, thus limiting the breadth of applicability or the ease of installation of new systems.

It is known from U.S. Pat. No. 4,802,231 (Davis) to generate error templates for a pattern matching process such as speech recognition, derived from words input to the recogniser, and erroneously recognised as matching a word in the vocabulary of the recogniser. Composite error templates may be generated by combining error templates.

It is known from U.S. Pat. No. 5,649,057 (Lee at al) to generate statistical models of extraneous speech and background noise, for use in an HMM (Hidden Markov Model) based speech recognition system. The system involves representing a given speech input as a keyword preceded and followed by sequences of such unwanted sounds. A grammar driven continuous word recognition system is used to determine the best-matching sequence of unwanted sounds and keywords. The model or models of the unwanted noises are refined by an iterative training process, i.e. varying the parameters of the HMM until the difference in likelihoods in consecutive iterations is sufficiently small. The iterative process starts with manual input of the keywords, the most important unwanted words, and noise samples, but may be performed automatically thereafter.

SUMMARY OF THE INVENTION

It is an object of the invention to provide improved methods and apparatus.

According to a first aspect of the invention there is provided a method of assessing decoys for use in an audio recognition process for identifying predetermined sounds in an unknown input audio signal, the method comprising the steps of:

carrying out a test recognition process by matching known training audio signals to models representing the predetermined sounds and the decoys; and determining for each of the decoys, from the results of the test recognition process, a score representing the effect of the respective decoy in the recognition of any of the known training audio signals. An advantage arising from generating scores for decoys is that the chance of a poor selection of decoys can be reduced. Thus the possibility of poor recognition performance arising from poorly selected decoys can be reduced. Furthermore, the requirement for expert input into the decoy creation process, which may be time consuming, can be reduced. This can make it easier, or quicker, or less expensive to install or adapt to particular circumstances. Also, better rejection, or less false acceptance may be achieved if some decoys are identified which are unexpectedly good.

Preferably, the known training audio signals comprise known non-vocabulary utterances, and the score additionally represents the effect of the respective decoy on the rejection of any of the non-vocabulary utterances. An advantage arising from this is that decoys suited to rejecting given non-vocabulary utterances could achieve good scores and be included in the final dictionary.

Preferably, the method comprises the preliminary step of generating at least some of the decoys from a random combination of component sounds. An advantage arising from this is that wider coverage of gaps between words in the vocabulary can be achieved, and the generation and selection can be easier to automate.

Preferably, the method further comprises the steps of determining for the respective decoy, further scores relating to further ones of the known training audio signals, and determining an accumulated score from the score, and the further scores. An advantage arising from this is that the scores will better reflect the effectiveness of the decoy.

Preferably, the method comprises the step of selecting which decoys to use according to the determined scores. An advantage arising from this is that ineffective decoys can be discarded, thus making the recognition process more economical, since fewer comparisons will need to be made.

Preferably, the audio recognition process comprises a speech recognition process, and the predetermined sounds comprise words. Preferably, the step of determining the score comprises the steps of:

determining whether the respective decoy is a closer match to a given one of the known training audio signals than the best matching predetermined sound; and determining the score according to the result. An advantage arising from this is that it helps determine objectively which are particularly good, and which are particularly bad decoys.

Preferably, the step of determining the score comprises the steps of:

determining how many other decoys are a closer match to the given one of the known training audio signals than the best matching predetermined sound; and determining the score according to the result. An advantage arising from this is that it helps determine objectively which are critically good, or critically bad decoys.

Preferably, the step of determining the score comprises the steps of:

determining how close a match the respective decoy is relative to any other decoys which are a closer match to the given one of the known training audio signals than the best matching predetermined sound; and determining the score according to the result. An advantage arising from this is that it helps to refine the scoring further, to distinguish between clusters of decoys.

According to another aspect of the invention, there is provided a method of audio recognition for identifying predetermined sounds in an unknown input audio signal, using decoys having associated scores determined by carrying out a trial recognition process by matching known training audio signals to models representing the predetermined sounds and the decoys, the scores representing the effect of a respective decoy in the recognition of any of the known training audio signals, the method comprising the step of:

performing the audio recognition process for identifying predetermined sounds in an unknown input audio signal by matching the unknown input audio signal to models of the predetermined sounds and the decoys, according to the scores associated with the decoys. If the decoys are well selected, rejection of non-vocabulary utterances can be improved, and/or recognition can be improved. The latter occurs by reducing confusion between similar words in the vocabulary, by selection of decoys which lie in between the similar words, and thus can suppress incorrect recognition.

According to another aspect of the invention, there is provided apparatus arranged to carry out the above methods.

According to another aspect of the invention, there is provided corresponding software.

Any of the preferred features may be combined, and combined with any aspect of the invention, as would be apparent to a person skilled in the art.

To show, by way of example, how to put the invention into practice, embodiments will now be described in more detail, with reference to the accompanying drawings.

BRIEF DESCRIPTION OF DRAWINGS

FIG. 10 shows in schematic form the recognition log of FIG. 4;

FIG. 12 shows in schematic form the process of FIG. 11 of determining a score for each decoy;

FIG. 15 shows in schematic form the word recognition step of the recognition process of FIG. 14;

DETAILED DESCRIPTION

Figure 1:
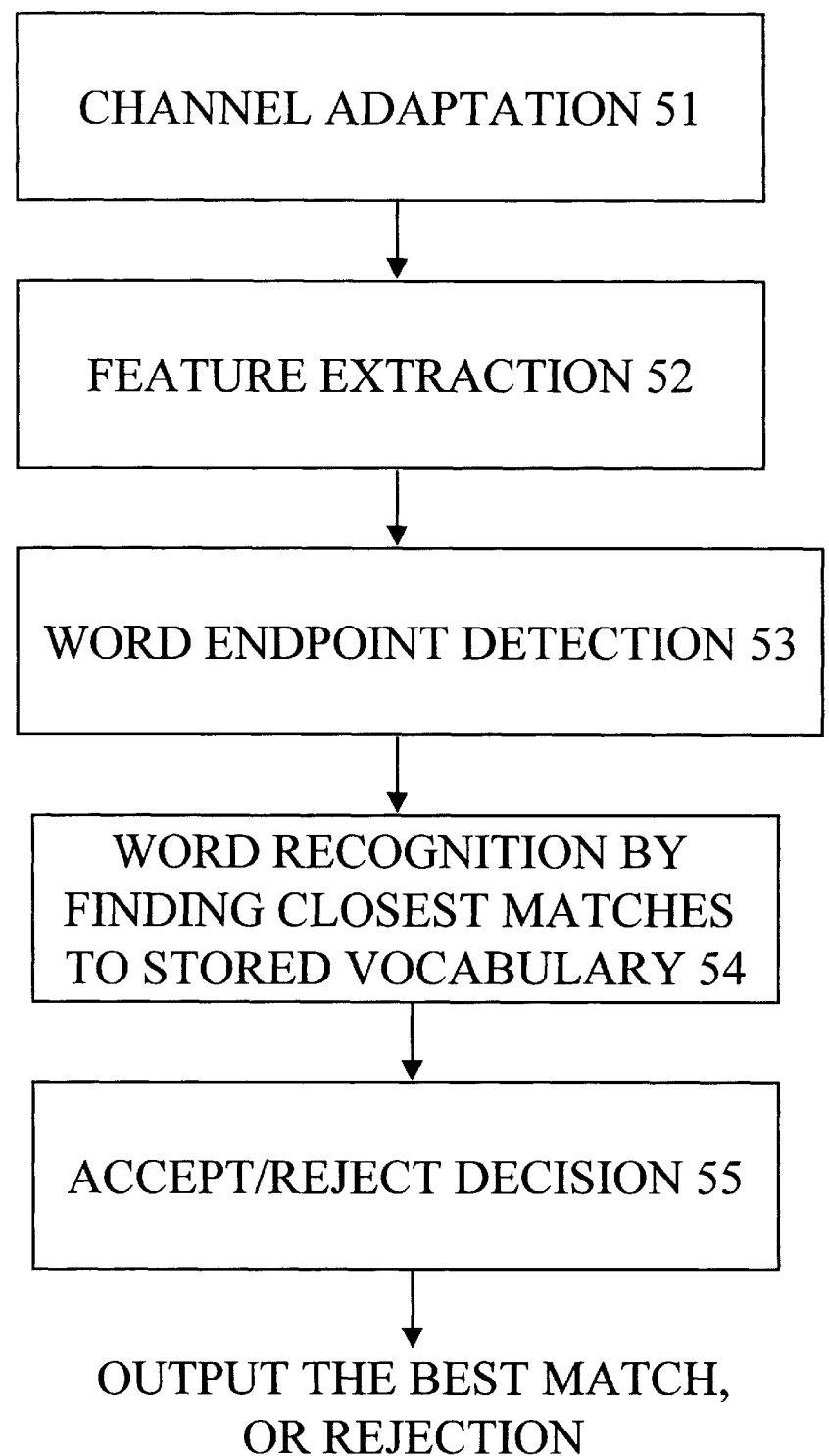
FIG. 1 shows an overall view of an example of a known pattern recognition process, for voice recognition.

FIG. 1—Voice Recognition

FIG. 1 shows an overall view of an example of a known pattern recognition process, for voice recognition. There are five main steps: channel adaptation (1), feature extraction (2), word end-point detection (3), speech recognition (4), and accept/reject decision logic (5).

In the first step—channel adaptation—the system monitors the characteristics of the telephone line that carries the speech, and creates an initial mathematical model of channel parameters, such as line noise level. This model, which is updated continually throughout the recognition process, is used to adapt the vector of coefficients generated during feature extraction so that the coefficients respond to foreground speech and block out line channel variations.

During the second step—feature extraction—the system divides the unknown word or phrase into short segments, called frames. Each frame lasts 12.75 milliseconds. Thus, a word such as Mississippi, which takes about a second to say, would be broken down into about 100 frames.

Next, the system conducts a spectral analysis of each frame and creates a mathematical vector representation of the spectrum. Each feature vector is a string of 15 coefficients. The first seven coefficients measure the energy of the frame at different frequency bands to distinguish, for example, between a high-frequency/s/sound, and a lower-frequency vowel. The remaining coefficients measure the rate of change of these spectral energies.

The third stage—word endpoint detection—is performed by an algorithm that uses the energy and short time spectrum of the speech signal. This algorithm removes silence before, after, and in the middle of the speech signal, and filters out unwanted background noise in order to expedite the speech-recognition stage.

Speech recognition is the fourth stage of the process. At this stage, the vector representations generated for each frame are compared with the FVR system's stored models for the recognition vocabulary. Each word in the vocabulary is represented by a string of hidden Markov models (HMMs), one for each phoneme in the word, as shown in U.S. Pat. No. 5,390,278 (Gupta et al.). The stored string of phoneme models that produces the best match is determined using the multiple-pass approach, at which point the spoken word is considered recognized, as shown in U.S. Pat. No. 5,515,475 (Gupta). The matching process is aided by statistical models and efficient search algorithms embedded in the hidden Markov models.

The final stage of the process is rejection decision scoring, which determines whether the best match found during the speech-recognition stage should be accepted or rejected. To perform this evaluation, the recognizer employs a mathematical distribution matrix. The closer the match, the more likely it is to be accepted. This feature provides the system with the ability to reject imposter input, that is, words not in its vocabulary.

Figure 2:
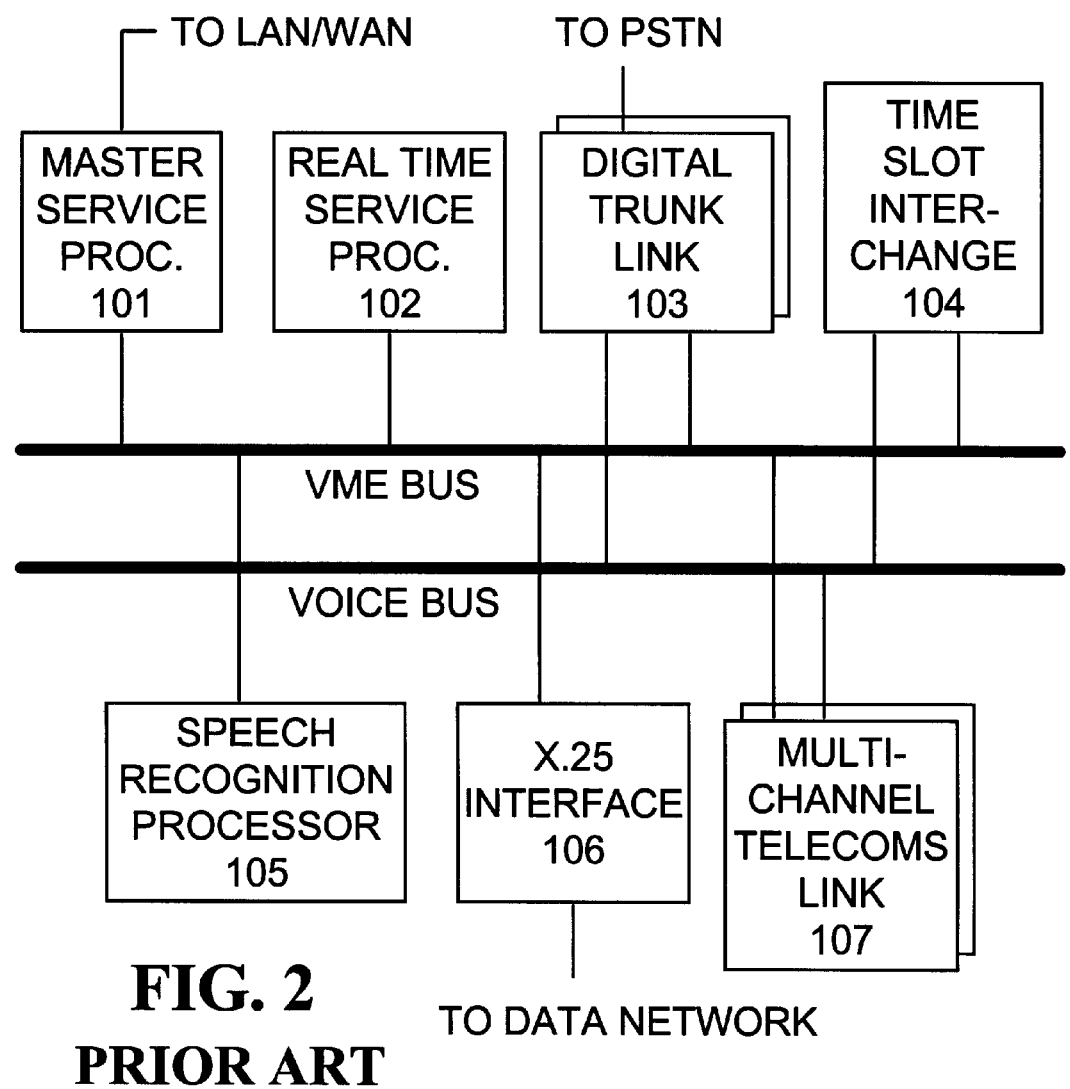
FIG. 2 shows in schematic form some of the principal hardware elements for a known voice processing platform.

FIG. 2—Known Service Controller Apparatus

FIG. 2 shows some of the principal hardware elements for a voice processing platform known as the Network Applications Vehicle (NAV). The NAV platform is designed for enhanced network services, and enables network providers to support an array of revenue-generating and cost-saving interactive and automated speech-recognition services.

The NAV cabinet is designed for central office installation and complies with Bell Communications Research Inc. (Bellcore) Network Equipment Building System specifications, a comprehensive set of requirements for central office equipment. Each NAV bay can be equipped with up to four speech-processing shelves. The NAV system can accommodate applications requiring from 24 to several thousand ports in single and multiple bay configurations.

The heart of NAV is a speech-processing subsystem known as the service controller. The service controller is comprised of a shelf of printed circuit cards and supporting software. NAV voice-processing technology is designed around the NAV bus, which combines an industry-standard VME computer bus with a proprietary digital voice or pulse code modulation (PCM) bus. (The PCM bus is based on Northern Telecom's DS-30 serial digital voice transmission standard used by DMS, Meridian Norstar, and Meridian 1 products.)

The service controller houses the main circuit cards as shown in FIG. 2, which include the following:

the digital trunk link (DTL) cards (103), proprietary cards that process incoming voice and data signals from the DS-1 digital network trunk and transmit them to the VME voice bus;

the time-slot interchange (TSI) card (104), a proprietary card that uses a custom silicon chip set developed for Northern Telecom's Meridian Norstar digital key telephone system to implement a 512 by 512 switching matrix for voice slot management. This matrix allows the DS-0 channels that enter the DTL card to be dynamically switched to the voice channels on the multi-channel telecommunications link card;

the multichannel telecommunications link (MTL) card (106), a proprietary card that terminates the voice signals generated by the TSI card uses digital signal processing to implement such functions as word end-point detection, speech recording and playback, compression and decompression, and speech concatenation; and detects dual-tone multifrequency tones entered by the person interacting with the system;

the speech recognition processor (SRP) card (105), a card for providing the computing power needed to support real-time speech recognition. The SRP further processes the speech information captured and pre-processed by the MTL card, selects the sequence of phoneme models in the recognition vocabulary that most closely matches the spoken word being recognized, scores the acceptability of the selected phoneme sequence using an accept/reject decision logic mathematical distribution matrix, and sends the result to the real-time service processor (RSP) card (102), a commercially available card that provides a third-party real-time operating system, called pSOS+, to perform real-time tasks, such as audio and resource management, and service control;

the master service processor (MSP) card (101), a commercially available card that uses a UNIX operating system to support computing and operations, administration, and maintenance functions. The MSP card provides an Ethernet controller, and a Small Computer Systems Interface (SCSI) to support disc and tape systems; and the input/output controller (IOC) (107), a commercially available card that supports X.25 packet-switched data links to information sources, such as attendant functions, external to the NAV.

Figure 3:
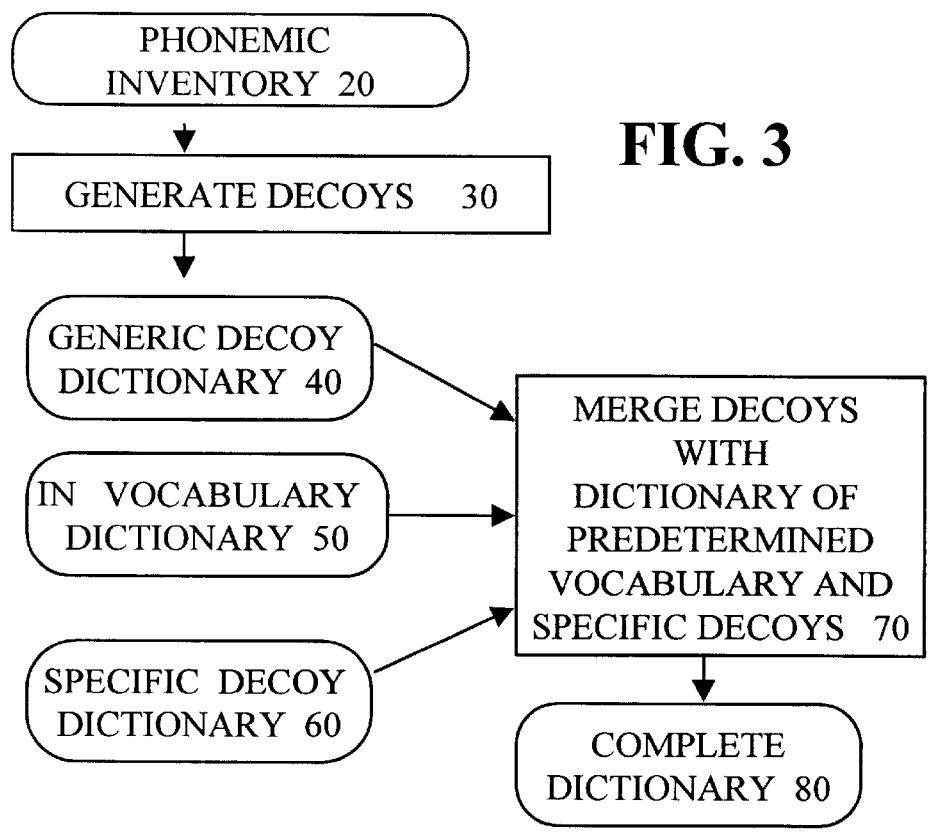
FIG. 3 shows in schematic form elements for dictionary generation including decoys, according to an embodiment of the invention.

FIG. 3—Dictionary Generation Including Decoys

Figure 4:
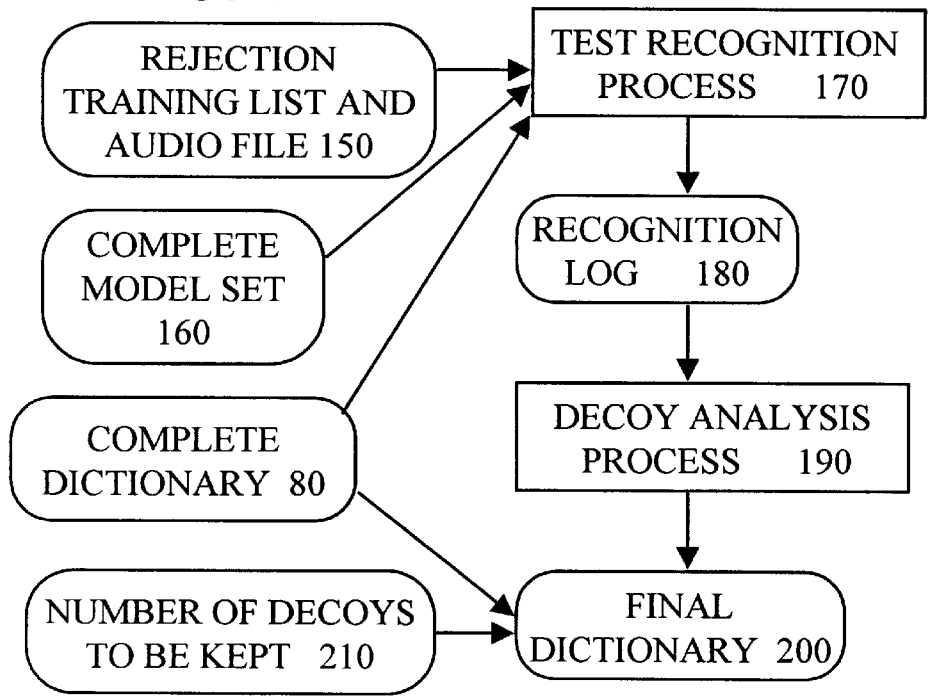
FIG. 4 shows in schematic form elements for decoy testing and analysis according to an embodiment of the invention.

FIG. 3 illustrates in schematic form how a complete dictionary is created, including decoys, ready to be used in a test recognition process as shown in FIG. 4. Elements shown in rounded rectangles represent data structures, and processing stages for processing the data are shown in rectangular boxes.

An inventory of phonemes, 20, feeds a process 30 for generating decoys. The inventory preferably is made up of a large number of relatively simple models of sub-word structures such as phonemes or allophones. It is not necessary for these models to be as accurately represented as the models for the words in the vocabulary of the dictionary, and the amount of processing involved when matching audio input against the decoys can be reduced if relatively simple models are used.

The decoy generation process generates decoys made up of random combinations of the sub-word elements, as described in more detail with reference to FIG. 5 below. A generic decoy dictionary 40 is created. This may have several hundred, typically five hundred of the randomly generated decoys. It is described in more detail with reference to FIG. 7 below.

At 70 in FIG. 3, the decoys are merged with the dictionary of predetermined vocabulary 50, and with specific decoys in a specific decoy dictionary 60. In this way, a complete dictionary 80 is formed, as described in more detail below, with reference to FIG. 6.

FIG. 4—Test Recognition Process and Decoy Analysis

The complete dictionary 80 is used in a test recognition process 170, together with a rejection training list and audio file 150, and a complete model set 160. The audio file contains known words in the vocabulary, and known utterances not in the vocabulary. In the test recognition process 170, each of these words and non-vocabulary utterances is compared to the entries in the complete dictionary, to produce a recognition log 180, described in more detail below, with reference to FIGS. 8, 9, and 10.

The recognition log 180 is subjected to a decoy analysis process 190 to identify and remove decoys with the worst scores, to produce a final dictionary 200. The decoy analysis process will be described in more detail below, with reference to FIG. 11. The final dictionary 200 will incorporate as many of the entries of the complete dictionary 80 as are desired for a given application, as specified by a user, illustrated at 210.

Figure 5:
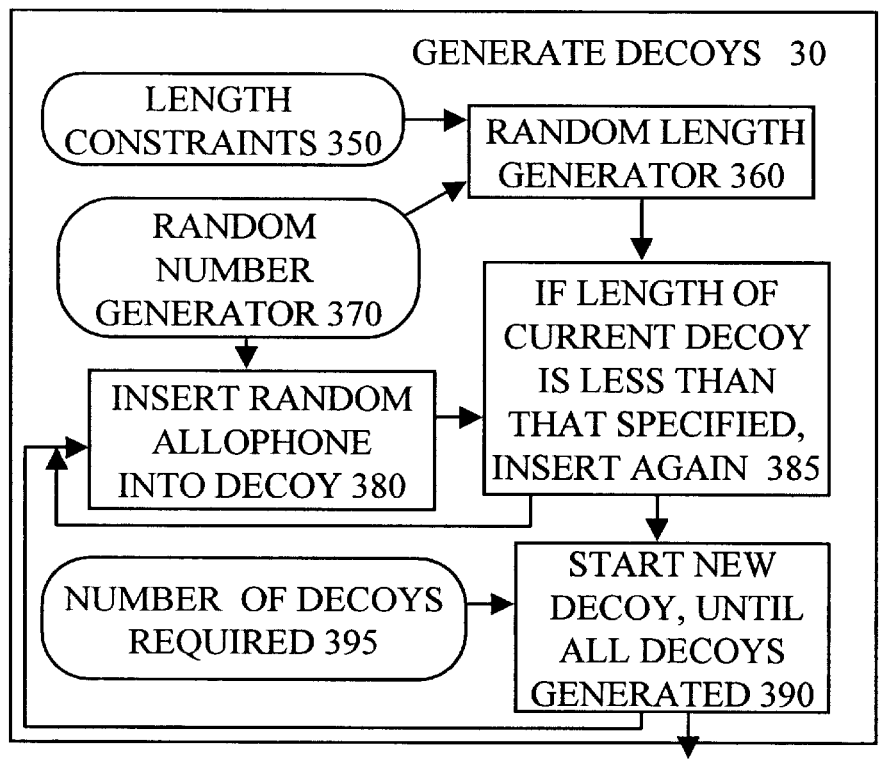
FIG. 5 shows in schematic form the decoy generation step of FIG. 3.

FIG. 5—Decoy Generation

FIG. 5 shows how a random decoy length generator 360 is fed by a random number generator 370, and length contraints 350, which may be specified by a user, to suit a given application. At 380, a random allophone from the phonemic inventory 20 is inserted into the current decoy. At 385, it is determined if the length of the current decoy is less than that specified by the random length generator. If so, a further random allophone is inserted at 380. Otherwise, a new decoy is started at 390. If all the decoys required have been generated, according to a value for the required number of decoys, stored at 395, the process ends and the generic decoy dictionary 40 is fully populated.

Figure 6:
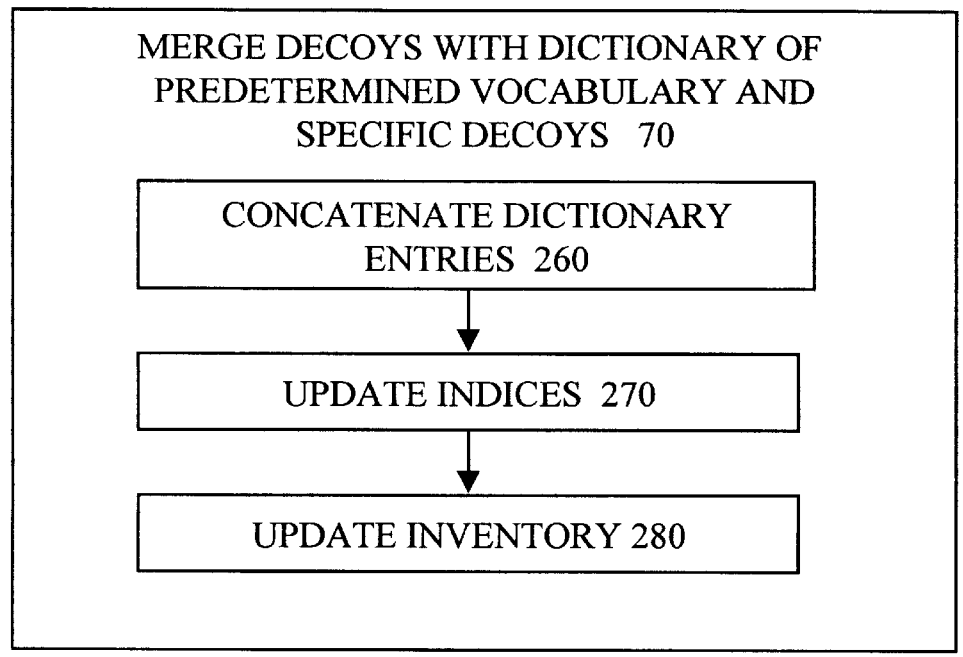
FIG. 6 shows in schematic form the decoy merging step of FIG. 3.

FIG. 6—Merging Decoys

The step 70 of merging decoys with the dictionary of predetermined vocabulary and the dictionary of specific decoys, is carried out by a simple concatination of the dictionary entries at 260. Indices are updated at 270, so that there is one set of consecutively numbered indices for the entire concatinated dictionary, instead of three separate sets. The indices are used for numbering and making reference to entries in the dictionary.

At 280, the dictionary inventory is updated. The inventory functions as a contents list for the dictionary, and therefore a single inventory list of the entire dictionary is needed.

Figure 7:
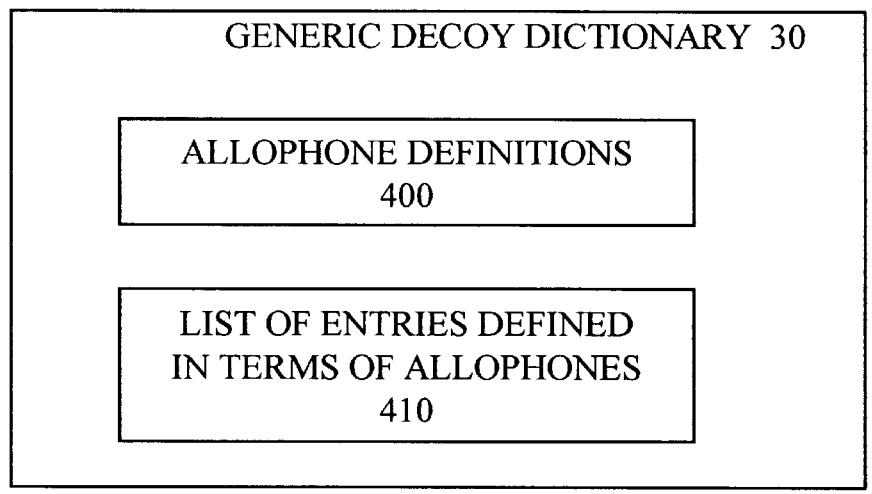
FIG. 7 shows in schematic form the generic decoy dictionary of FIG. 3.

FIG. 7—Generic Decoy Dictionary

The structure of the dictionary is shown in schematic form in FIG. 7. First, allophone definitions 400 are provided, giving transcription for all the allophones used in the dictionary. This is followed by a list of entries in the dictionary 410, defined in terms of the above-mentioned allophones.

Figure 8:
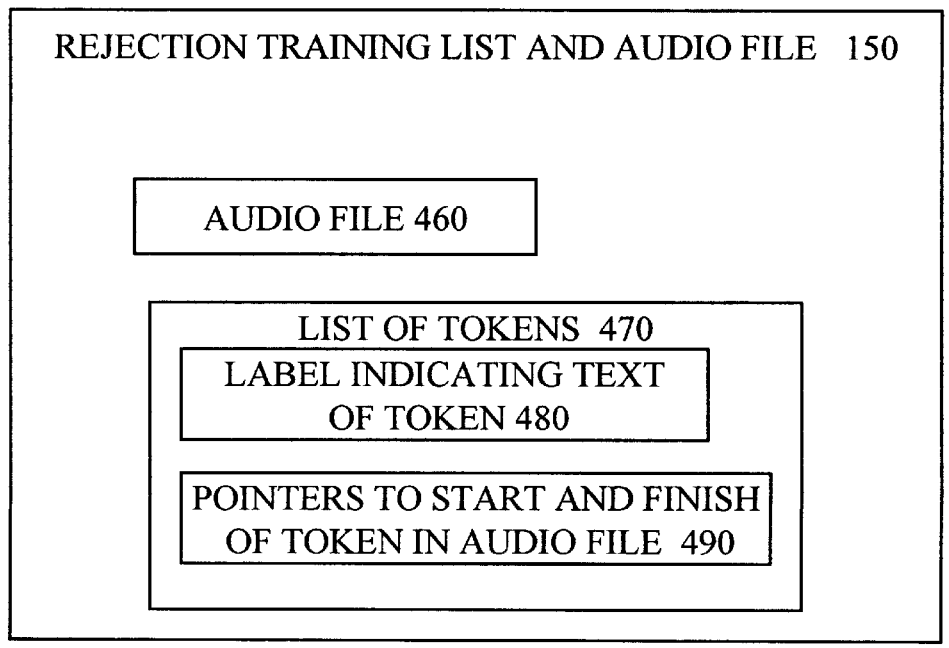
FIG. 8 shows in schematic form the rejection training list of FIG. 4.

FIG. 8—Rejection Training List and Audio File

At 460, the audio file is illustrated. This would normally be a digital representation of an audio signal, recording actual human speech. A list of tokens 470 includes, for each token, a label 480 indicating the text of the token. Token here is used as indicating an utterance. The label might be in the form of a series of ASCII characters. Pointers 490 are included, indicating start and finish points of the given token, in the audio file. This could be achieved by timing markers in the audio file, or by appropriate memory addresses.

Figure 9:
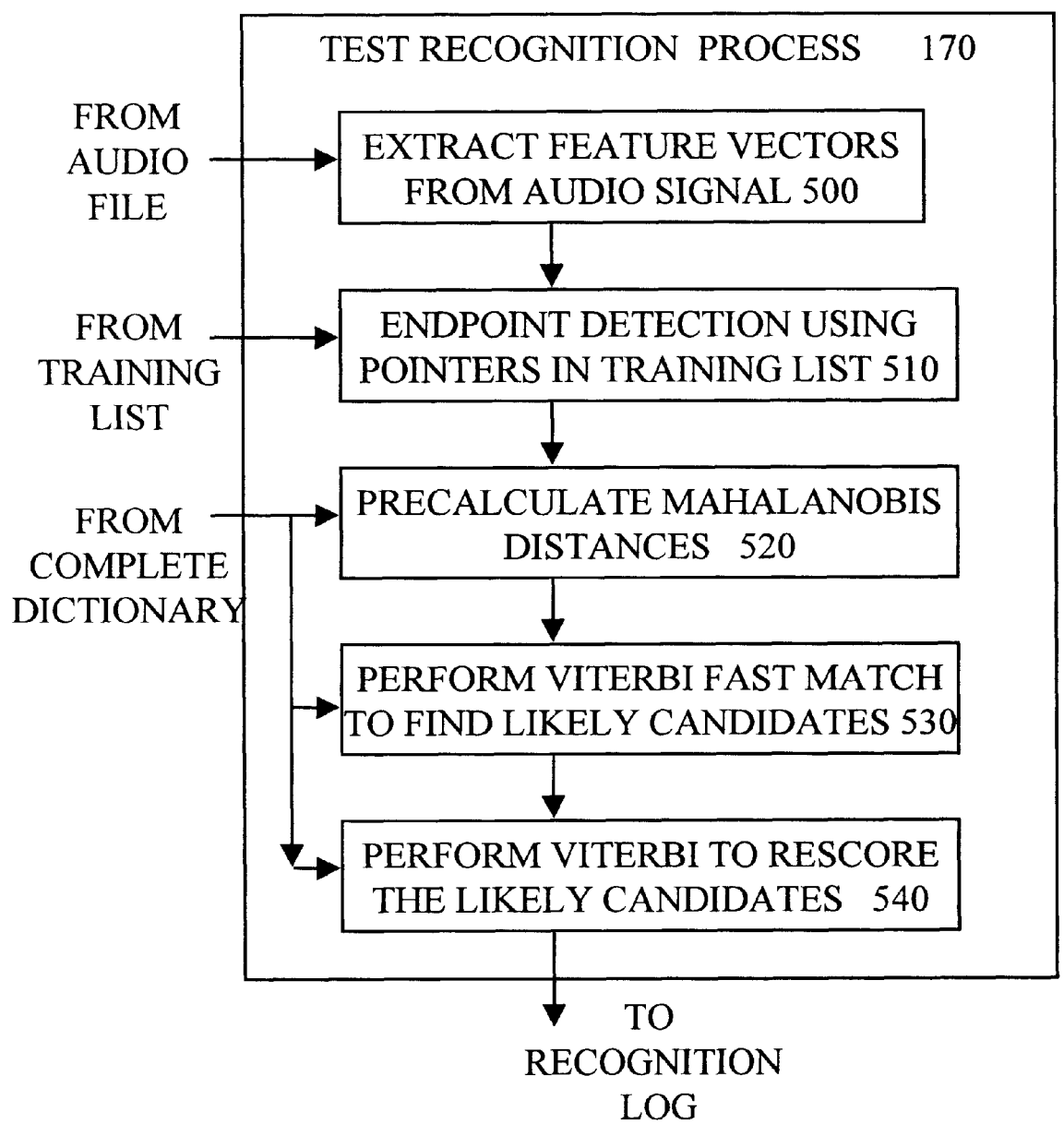
FIG. 9 shows in schematic form an overall view of the test recognition process of FIG. 4.

FIG. 9—Test Recognition Process 170

This process uses some of the features of the conventional recognition process shown in FIG. 1. First, feature vectors are extracted from the audio file, at 500, in a similar manner to the process of FIG. 1. This feature extraction process will be described in more detail below. End point detection is carried out at 510. This process differs from the end point detection of FIG. 1 in that the training list comprises pointers to the end points. These pointers are used to enable unambiguous end point detection.

The actual recognition then follows, using the complete dictionary 80. The three principal steps in the recognition are illustrated. Mahalanobis distances are precalculated at 520. This step and the significance of the Mahalanobis distances will be explained below in more detail. Briefly stated, the Mahalanobis distance gives a representation of the probability of a particular feature vector matching a given transition in the finite state model of the word in the more dictionary. Following this, the next two steps are concerned with finding the best matching path of successive transitions through the finite state model, based on the precalculated distances. At 530, a preliminary Viterbi fast match algorithm is used to find the most likely candidates in the dictionary. Only these most likely candidates are then taken forward to step 540, where they are rescored using the Viterbi algorithm and a full matching process using fully detailed models, and all the relevant feature vectors.

The results of the test recognition process are output to the recognition log 180.

Recognition Log 180

For each of the tokens in the training list, a record is maintained including the following information. First of all a record is kept of whether the token is in the dictionary, or whether it is an non-vocabulary utterance. This will be used later to determine whether the score should be positive or negative. An orthography of the token is included, comprising the text label, and other properties such as whether the speaker was male or female, whether the speech was recorded in a noisy environment, and so on. The record in the log then lists the N closest matching entries from the complete dictionary. Typically 10 to 20 matches might be included, depending on memory limitations, and how often all N matches are found to be decoys.

If all N matches are decoys, then it cannot be determined whether the decoys were successful in being closer matches than an incorrect vocabulary word from the dictionary, or whether the decoys were interfering and preventing a correct recognition. Hence, it is important to maintain N large enough that the closest matching vocabulary word in the complete dictionary is usually included in the N matches maintained in the recognition log. It would be conceivable to store all the closest matching dictionary entries until the first non-decoy, or vocabulary entry.

For each match with a given token, the recognition log includes details of the transcription, and the score output by the test recognition process. As illustrated in FIG. 10, the closest match to the first token, the word "call" is decoy number 4, with a transcription "KRL" , and a score of −20. The examples illustrated are not actual outputs, but are simplified examples for the purpose of illustration.

Figure 11:
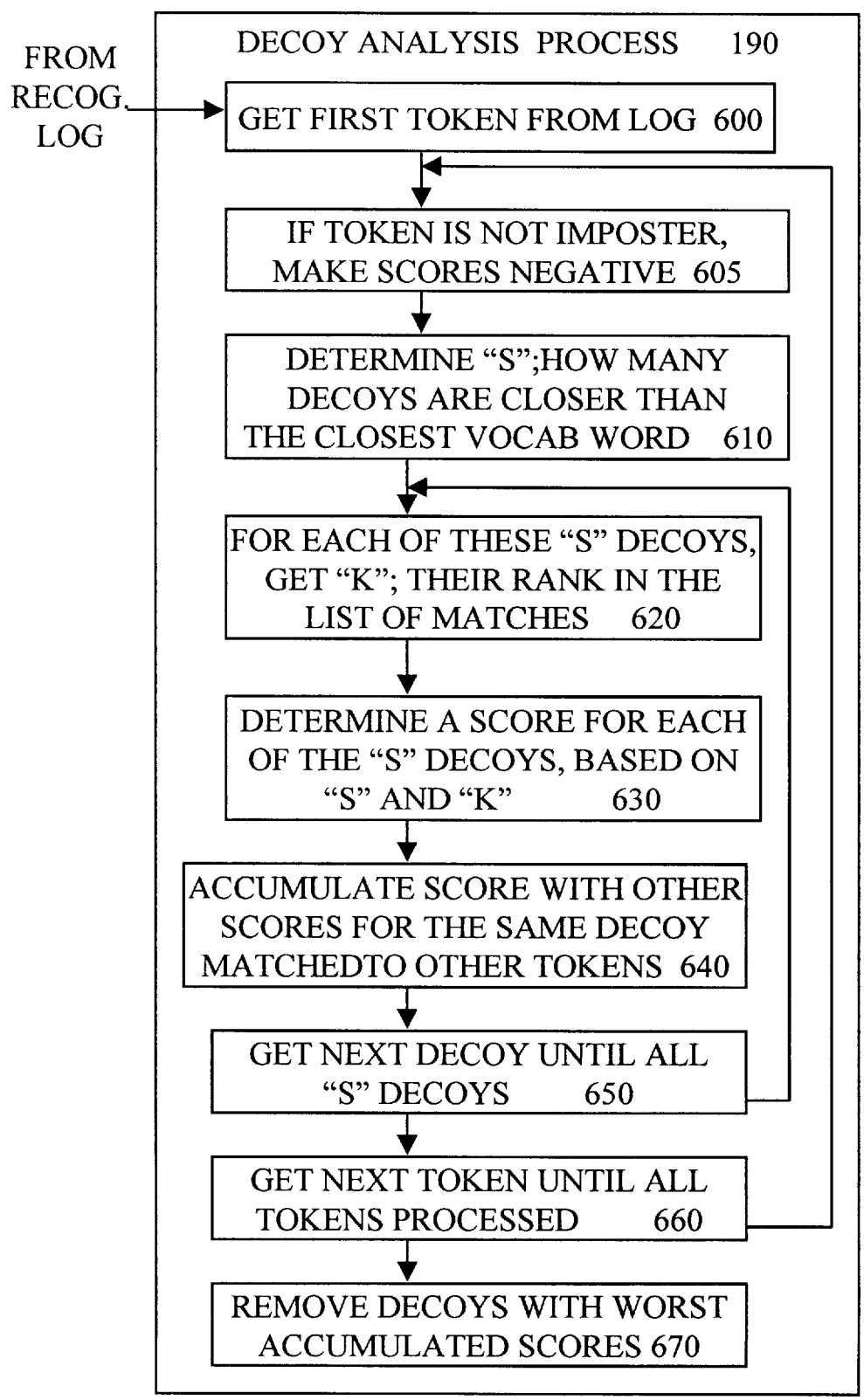
FIG. 11 shows in schematic form the decoy analysis step of FIG. 4.

FIG. 11—Decoy Analysis

Each of the tokens in the recognition log 180 are then processed as illustrated in FIG. 11. At 600, the first token is retrieved. At 605, if the token is not a non-vocabulary utterance i.e. not an imposter but, is an in-dictionary token, then the scores determined subsequently will be negative. At 610, the parameter S is determined, representing how many decoys are closer matches than the closest matching vocabulary word. This is determined by searching through the closest matches in the record for that token, until the closest matching vocabulary word is found.

At 620, the parameter K is determined, representing the rank of each given decoy in the list of matches to that token, in the recognition log. K equals 1 for the closest matching decoy, K equals 2 for the second closest matching decoy, and so on.

At 630, a decoy effectiveness score for that token is determined for each of the S decoys, according to parameters S and K. At 640, this score is accumulated with other scores for the same decoy, when that decoy was matched to other tokens. This is typically implemented by incrementing or decrementing a counter for each of the decoys. At 650, the process loops back to step 620, to repeat the determination of the score for each of the S decoys. At 660, when all S decoys have been processed for a given token, the process loops back to step 605 to repeat for a next token, until all the tokens are processed.

Finally, at 670, the decoys with the worst accumulated scores are removed, to create the final dictionary containing only the best decoys. Some of the steps of FIG. 11 will now be described in more detail.

FIG. 12—Determing a Score for Each Decoy

The step 630 of FIG. 11 is expanded in FIG. 12. A decoy effectiveness score is determined at 710 using the algorithm shown, where the score equals $(S-K+0.5)/S^2$. This algorithm is selected to give a linear relationship between the score and the rank, among the S decoys, though non linear relationships could be used. It also reflects directly how large S is. If S is small, it indicates that the decoy is particularly important, either particularly bad if it is more closely matched than the correct vocabulary word, or particularly good if it is more closely matched than an incorrect vocabulary word.

As well as determining a score which will be accumulated for a given decoy, it is also useful to record how many times a particular decoy is good or bad. As 720, a counter recording "bad" score is incremented if the decoy is one of several decoys better matched than the best and correct vocabulary word.

At 730, a counter recording an "ES_BAD" score is incremented if the decoy is the only decoy better matched than the best and correct vocabulary word.

At 740, a counter recording a "GOOD" score is incremented if the decoy is one of several decoys better matched than the best, but incorrect, vocabulary word.

Finally, at 750, a counter recording an "ES_GOOD" score is incremented if the decoy is the only decoy better matched than the best, but incorrect, vocabulary word.

As will be described below, the decision on which decoys to remove may be made just according to the accumulated score, or may be made dependent on some combination of the accumulated score, and the counters indicating how many times good or bad scores were obtained. The final outputs of the counters may be presented to a user for further manual selection of decoys after the automatic selection, or to enable the test recognition process, or the training list to be refined.

Not shown is a further counter, which may be incremented for a given decoy, each time there is an instance where all the entries in the recognition log for a given token, are decoys. In this case, a discussed above, it is ambiguous whether the score should be positive or negative, and therefore in such cases, the accumulated score for the decoy should not be changed. The number of times a decoy is matched and found in the recognition log, but for which the score is ambiguous, can be recorded and used in refining the decoy generation, testing and analysis processes. Optionally, the automatic removal of decoys could be made dependent on the ambiguity score not exceeding a given threshold.

Figure 13:
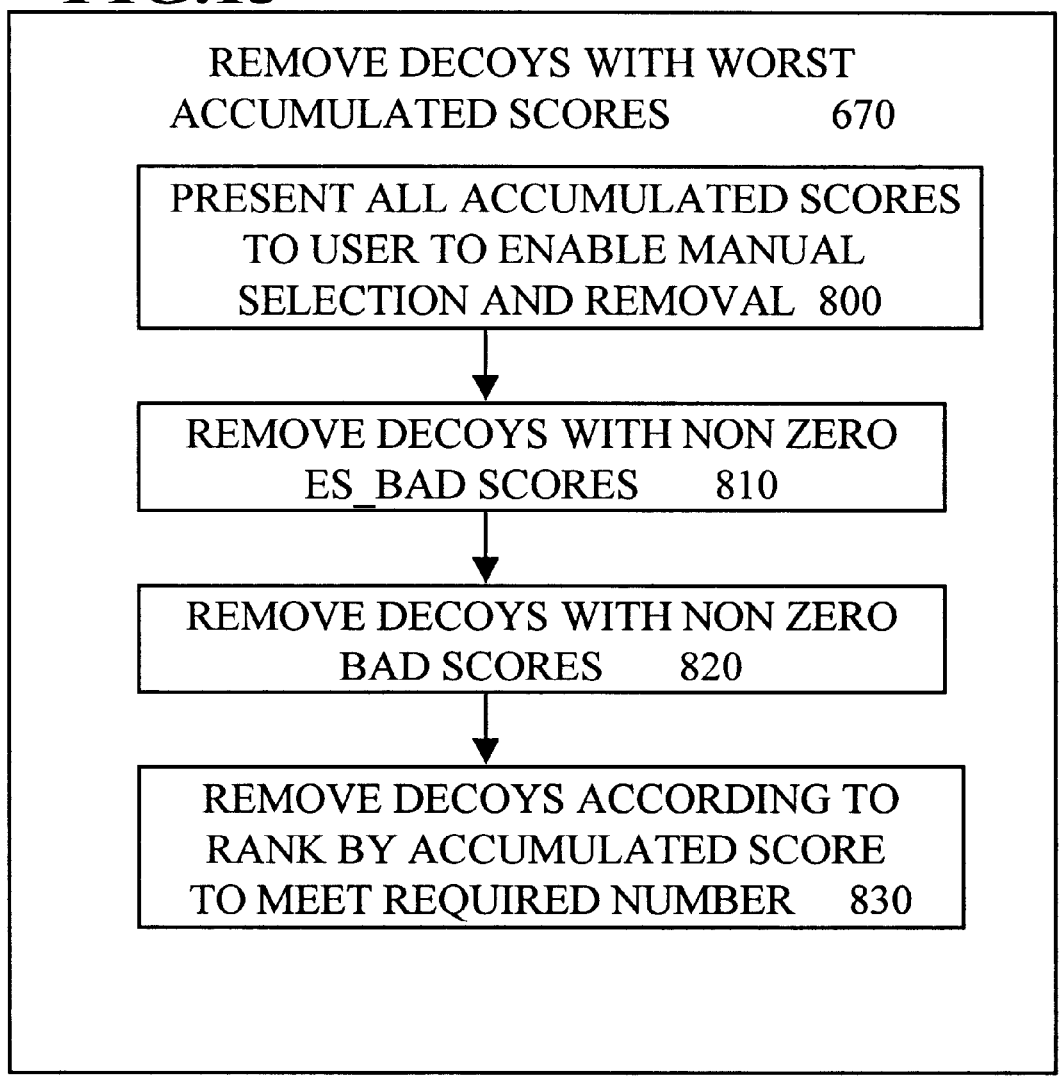
FIG. 13 shows in schematic form the process of FIG. 11 of removing lowest scoring decoys.

FIG. 13—Removing Lowest Scoring Decoys

Various removal or selection algorithms could be envisaged, using the scores obtained above. In the example shown in FIG. 13, the accumulated scores are presented to the user, together with the counter outputs, to enable manual selection and removal, at 800. In the meantime, the automatic removal proceeds at steps 810 to 830. At 810, decoys with non-zero ES_BAD counter scores are removed, such decoys may be critical in preventing recognition in some instances, even if their overall accumulated score is not particularly bad.

At 820, decoys with non-zero BAD counter scores are removed. Such removal could be made dependent on whether sufficient decoys have been removed to meet the required number of decoys. Alternatively, the required number of decoys could be made dependent on the scores achieved, so that instead of using a fixed number of decoys, if the decoys score well, then more decoys are used, and if they score badly, then less decoys are used.

At step 830, if necessary to meet the required number of decoys, further decoys are removed according to their accumulated scores.

Figure 14:
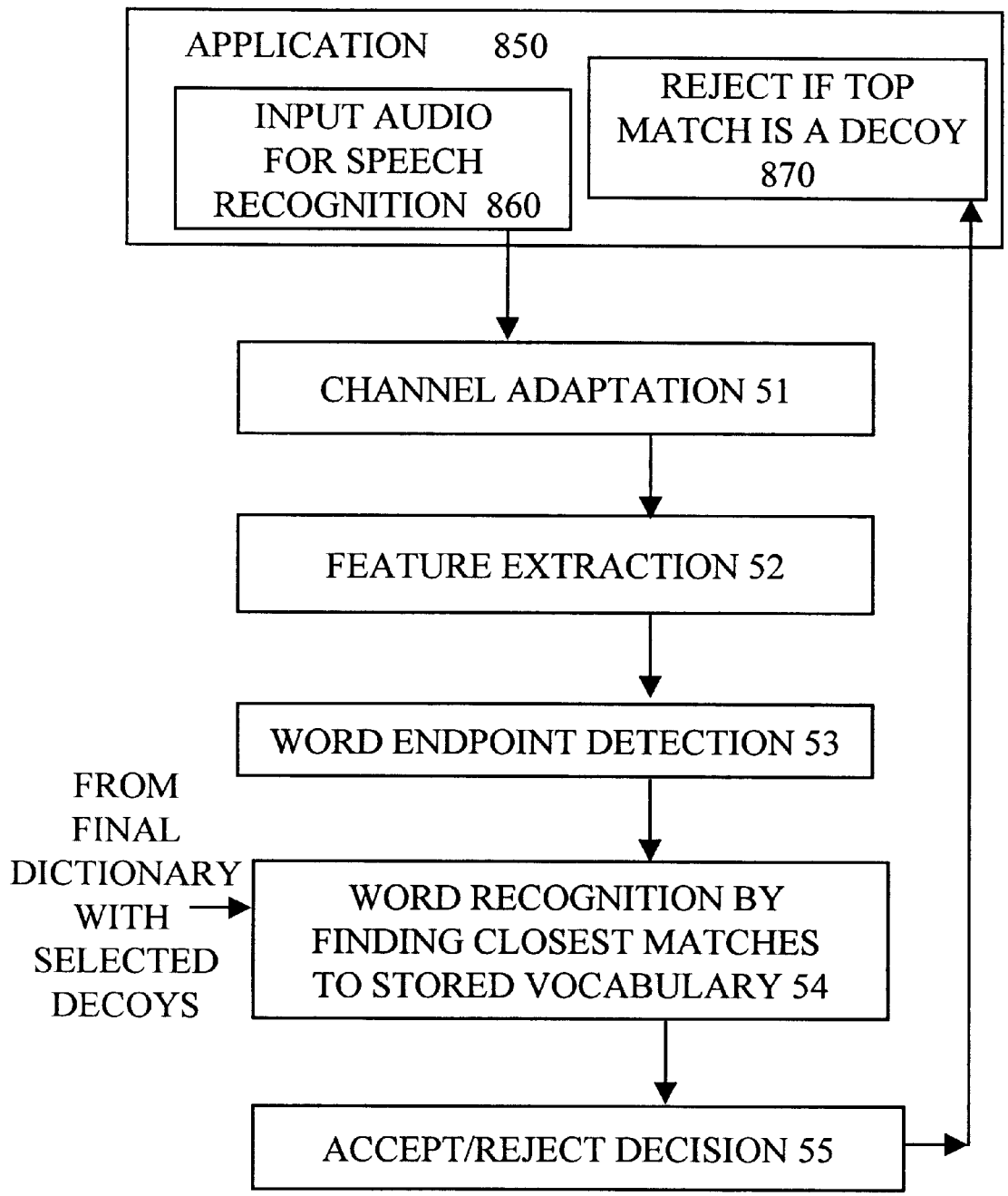
FIG. 14 shows in schematic form an overall view of a recognition process using the dictionary with decoys according to an embodiment of the invention.

FIG. 14—Recognition Process Using Decoys

FIG. 14 illustrates in schematic form an overall view of a recognition process using the dictionary with decoys selected as discussed above, according to an embodiment of the invention. An application 850 initiates the speech recognition process by passing audio input at 860, to a speech recognition process corresponding to that shown in FIG. 1. This includes the steps of channel adaptation 51, feature extraction 52, word end-point detection 53, and word recognition 54, using the final dictionary, containing the selected decoys. Following an accept/reject decision 55, the closest match is returned to the application. At 870, the application determines if the top match is a decoy, and rejects the result if it is a decoy. This latter step could conceivably be carried out as part of the accept/reject decision 55.

FIG. 15—More Detailed View of Recognition Step

FIG. 15 shows in schematic form the main steps in the word recognition step 54 shown in FIG. 1 or in FIG. 14. Following word end point detection, each word is input as a series of observations in the form of cepstral vectors 20. At this point, Mahalanobis distances may be precalculated, for all observations, and all models, and stored as a table of scalar values, one for each branch of the model. If there are multiple PDFs (Probability Density Function) associated with each branch, the value that is stored for that branch is one which gives the highest likelihood, based on the calculated Mahalanobis distances, and weighting factors for each PDF (described below).

These distances give an indication of probability or closeness of match of individual observations to individual transitions to states. To complete the matching, it is still necessary to accumulate these probabilities for paths or sequences of states in the finite state machine, as follows. At 21, a comparison or matching step is carried out. For each observation in the series, a probability is calculated of the observations so far being the same as each of the multiple paths represented in the stored HMM trellis, as will be explained in more detail below. As shown at 22, this comparison step is repeated by following loop 1 for each model in the form of an HMM. The best score for each state in the trellis for the particular observation, is stored for use in calculating the probability scores for the next observation. As shown at 23, the process is repeated via loop 2 for the next observation, until all the observations have been processed.

This method of calculating all the relevant scores for one observation before moving on to the next observation results in the order of making the calculations corresponding to the order of receiving the observations. Also, it is intuitively well-matched to the way that equations of methods such as the Viterbi algorithm, are commonly understood and explained.

The speech recognition system described in more detail below is based on Flexible Vocabulary Recognition (FVR), which relies on phone-based sub-word models to perform speaker-independent recognition over the telephone. Most applications using this technology are currently based on isolated word recognition, with a limited word-spotting capability in some applications. Rejection as shown in step 55 of FIG. 1, or FIG. 14, is an integral component of the technology, since the system must detect both its own recognition errors and when the user has said something that it cannot understand, in order to provide reliable performance. The sub-word models use hidden Markov modelling.

Feature Extraction

The purpose of the signal processing component is to convert the utterance, which is a series of samples of speech, into a more compact series of feature vectors. Besides being more compact, the feature vectors provide better speech recognition performance since they tend to remove many speaker-dependent effects and improve the robustness of the system to noise. The feature vector currently consists of 15 elements, which are constructed from the mel-cepstral coefficients (refer to Deller et al.). The first seven elements of the feature vector, often referred to as the static parameters, are the cepstral coefficients $c_1, \ldots, C_7$. The remaining eight elements, often called the dynamic parameters, or delta cep, are $\delta c_0, \ldots, \delta c_7$, which are estimates of the first derivative of each cepstral coefficient.

There are three types of feature vector, or cep, in use. The first is standard cep, which is based on the usual mel-cep. The second, which is called equalized cep, uses a simple noise model to remove some of the effects of noise in the utterance. The last, called enhanced cep, uses cepstral mean subtraction to remove some of the channel-dependent effects. The calculation of the standard cep is taken from Sharp et al. (1992).

In standard cep, the observed speech signal ( $y(t)$ ), sampled at $f_s=8$ kHz, is decomposed into overlapping frames of duration $N_w=204$ samples, and overlap $N_o=102$ samples. A power spectrum is computed for each frame, using a $K=256$ point FFT. Log-channel energies (LCE) are computed by passing the spectrum through a triangular filter bank. Finally, the energies are transformed into the mel-cepstrum (MEL-CEP). Each frame is represented by a 15-dimensional vector consisting of seven static MEL-CEP parameters, seven dynamic MEL-CEP parameters, and one dynamic energy parameter.

Flexible Vocabulary Recognition (FVR)

FVR attempts to produce a set of models for a new application or task without requiring task-specific training data for the models. Ideally, the application builder would provide a list of words to be recognized, hit "Return", and the FVR process would automatically construct a load, including the models to be used, lexicon, and the language model (in a continuous-speech application). Although having accoustic models which accurately model speech, even for novel tasks, is crucial for a successful system, FVR also relies on the ability to predict how people are going to pronounce words, based simply on the orthography. This, in itself, is a fairly daunting problem, for many reasons, including:

1. speaker variability—different speakers tend to pronounce words differently, depending on their background, and the environment.
2. different accents—the accent can vary widely, even in the same country (compare Newfoundland with Ontario, or Georgia with New York City).
3. non-English words—many proper names (such as locality and company names) do not originate from English, so that even native speakers may not be sure how they are pronounced.
4. non-native speakers—even humans may have difficulty understanding non-native speakers with strong accents.

Some of these problems have been dealt with, at least to some degree, even if only by collecting the appropriate training data. For others, such as strongly different accents, collecting some training data for the accent region to use as the basis for modelling may be the only solution.

Figure 16:
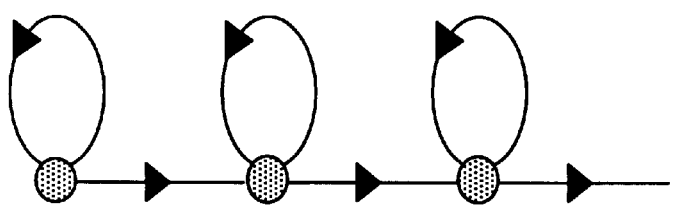
FIGS. 16 to 18 show schematic representations of Hidden Markov Models.

FIG. 16—Accoustic Modelling, and a Basic HMM Topology

The first step is to determine which allophones to use. Allophones are accoustic realisations of individual phonemes, in particular phonetic contexts, i.e. dependent on what comes before or after it. Having decided on a set of allophones to use, it is necessary to find models for each allophone that can be used to recognize utterances. The modelling paradigm used here is to construct models using hidden Markov models (HMMs) (see Deller et al. 1993, Rabiner 1989) (see FIG. 16, illustrating a number of states, and paths leading to the next state, or to the same state). The HMMs for the allophones can be easily concatenated together to produce word models. Essentially, an HMM is a finite state machine, with probability distributions (pdfs)

attached to it. A basic assumption of the HMM paradigm is that the random process modelled by each state is stationary for the duration of the state. In this way, speech, which is non-stationary, can be modelled as a series of piece-wise stationary segments.

The primary tool for training and testing models is a C++ program and library that allows many functions related to HMMs to be performed. In addition, if it is intended to be used as a research tool, it should be easy to modify, and support a very flexible set of model topologies, and arbitrary parameter tying.

HMMs are assumed to be transition based. That is, if the HMM is used to actually generate a random process, then observations are produced when a transition is traversed. In the transition-based topology, each transition leaving a state may have a different pdf to model it. A disadvantage of the transition-based approach is that the transitions from one state to another may tend to be less well trained, since fewer frames may be aligned to them than the self-loops. To avoid this problem, as well as to reduce the number of parameters, a state-based topology can be used, where the pdf is state-dependent, and all the transitions out of the state share the same pdf. This is achieved by tying together the pdfs of all the transitions leaving a state.

Each pdf is assumed to be a mixture of N-variate Gaussian distributions, where N is the dimensionality of the feature vector. Recall that the pdf of an N-variate Gaussian pdf has the form $$f(\underline{x}) = \frac{1}{(2\pi)^{N/2}\sqrt{|C|}} \exp\left[-\frac{1}{2}(\underline{x}-\underline{\mu}_i)^t C^{-1}(\underline{x}-\underline{\mu})\right], \quad \text{(EQ. 1)}$$

where $\underline{x}$ is the N-dimensional observation vector, $\underline{\mu}$ is the mean vector, and C is the covariance matrix. A single Gaussian distribution is unimodal; that is, it has a single mean. To more accurately model speech, it is necessary to use multimodal distributions; that is, pdfs that have more than one mean. A multimodal Gaussian, or mixture distribution, is obtained by taking a weighted sum of unimodal pdfs; that is, $$f(\underline{x}) = \sum_{i=1}^{M} w_i f_i(\underline{x}) \quad \text{(EQ. 2)}$$

where $\Sigma_{w_i}=1$, to ensure that the pdf integrates to 1, and $$f_i(\underline{x}) = \frac{1}{(2\pi)^{N/2}\sqrt{|C_i|}} \exp\left[-\frac{1}{2}(\underline{x}-\underline{\mu}_i)^t C_i^{-1}(\underline{x}-\underline{\mu}_i)\right] \quad \text{(EQ. 3)}$$

is the unimodal pdf of each mixture component. In theory, a Gaussian mixture distribution can match an arbitrary distribution, arbitrarily closely, if there are sufficient mixture components. In most cases, speech can be modelled with a fairly small number of mixture components (from 5 to 40, depending on the type of models and the application).

Exactly how many mixture components should be used is still an open problem. A larger number of mixture components will cover the acoustic space better, but if there are too many, it may be impossible to train them well, and the computation overhead may become too expensive. One way to overcome, at least to some degree, these two opposing constraints is to use the same mixture components in more than one mixture distribution. Such an approach is called tied-mixtures. There are many possible ways in which the mixture components may be tied. For example, as in the original tied-mixtures research, a large number of mixture components may be used, where each mixture distribution has the same underlying unimodal distributions, but the mixture weights are dependent on the state in which they occur. Another approach would be to constrain all the allophones of a phone to share the same mixture components, with allophone-dependent mixture weights.

To support such a wide variety of potential tyings, a flexible model structure should be provided (the price of such flexibility is that it is not always simple to set up the models, since a certain amount of careful book-keeping must be done). Briefly, the C++ program and library is constructed in terms of layers of pools, and each layer contains pointers to the layer below. At the bottom layer, there are rotations (the rotation is determined from the covariance matrix—see below). The next layer contains pdfs, which consist of a mean vector and a pointer to a rotation. Pdf_sets are collections of pointers to pdfs. A mixture contains a pointer to a pdf_set and a vector of mixture weights. The fenone, which is essentially a state in the HMM, contains pointers to several mixtures (one for each transition out of the fenone), a set of transition weights, and the destination state for each transition. The next higher layer is the state layer, which has pointers to fenones (usually, each state has one fenone associated with it). Finally, there is the model layer, which is a collection of states and represents the HMM, which itself typically models an allophone. This notion of pools clearly supports a wide variety of tyings, but it is also necessary to keep careful track of the pointers. Tools do exist that provide basic schemes with a minimum of effort on the user's part, but more sophisticated schemes require their own tools.

The Rotation Matrix

A rotation matrix is a covariance matrix that has been transformed to reduce the number of floating point multiplications. During training and recognition, it is necessary to make computations of the form $$(\underline{x}-\underline{\mu}_i)^t C_i^{-1}(\underline{x}-\underline{\mu}_i) \quad \text{(EQ. 4)}$$

for each mixture component in the model set (Equation 4 is referred to as a Mahalanobis distance). The problem with applying Equation 4 directly is that it contains a large number of redundant computations, particularly when the total number of rotations is reasonably small (which is usually the case). Using several tricks, it is possible to reduce the number of multiplications significantly.

The first trick involves decomposition of the inverse of the covariance matrix into a product of two matrices of the form $$C_i^{-1} = LL^t, \quad \text{(EQ. 5)}$$

where L is a lower triangular matrix (that is, all of its components above the main diagonal are zero). This decomposition, using the Cholesky algorithm, is possible because the covariance matrix is always positive definite (that is, all of its eigenvalues are positive). The Cholesky algorithm is simple, fast, and numerically stable.

Equation 4 can be rewritten as $$(x - \underline{\mu}_i)^t LL^t(x - \underline{\mu}_i) = (x^t L - \underline{\mu}_i^t L)(L^t x - L^t \underline{\mu}_i), \quad \text{(EQ. 6)}$$

and, observing that $L\underline{x} = \underline{y}$ and $L\underline{\mu}_i = \underline{z}$, Equation 4 reduces to $$(x - \underline{\mu}_i)^t C_i^{-1}(x - \underline{\mu}_i) = \underline{y}^t \underline{y} - 2\underline{y}^t \underline{z} + \underline{z}^t \underline{z}, \quad \text{(EQ. 7)}$$

where $\underline{z}$ and $\underline{z}^t\underline{z}$ are precomputed. The $\underline{y}$'s are computed at each frame by multiplying the observation vector $\underline{x}$ by each rotation matrix L in the model set (this is where the assumption that the number of rotations matrices is relatively small comes into play).

Figure 17:
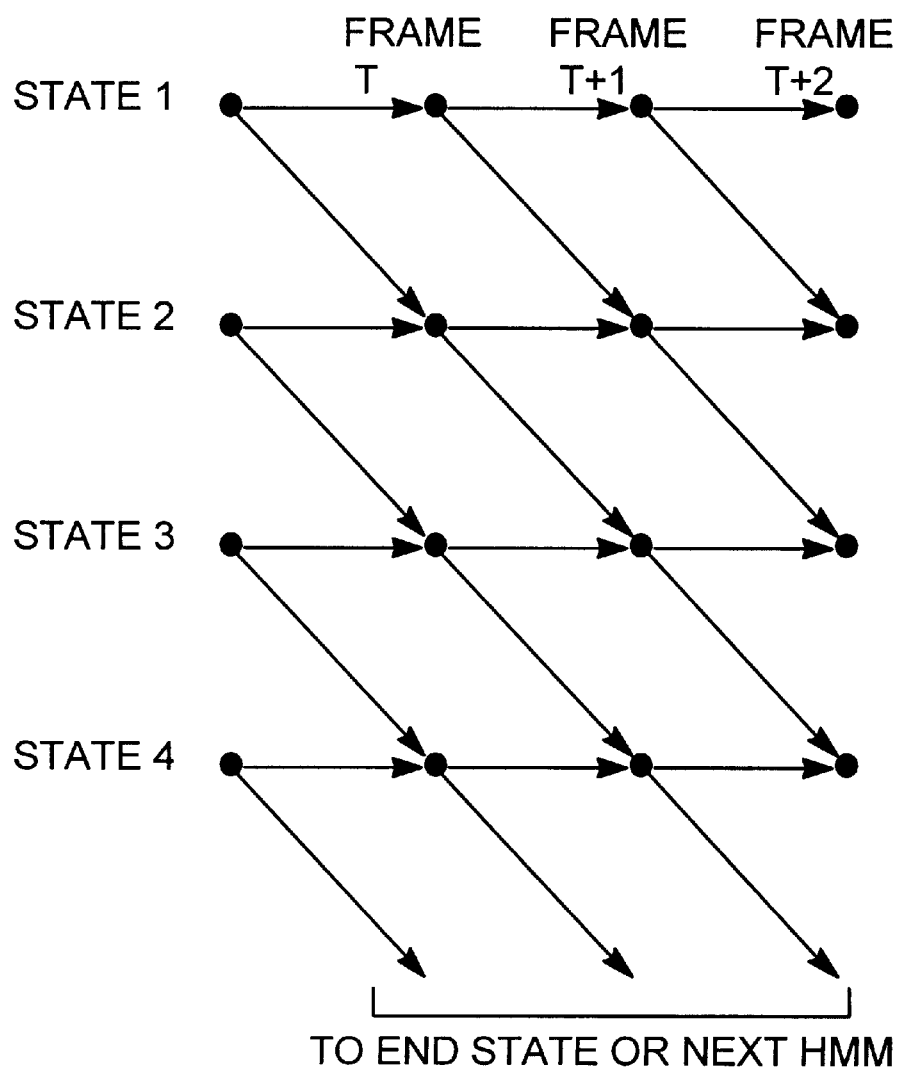
Figure 18:
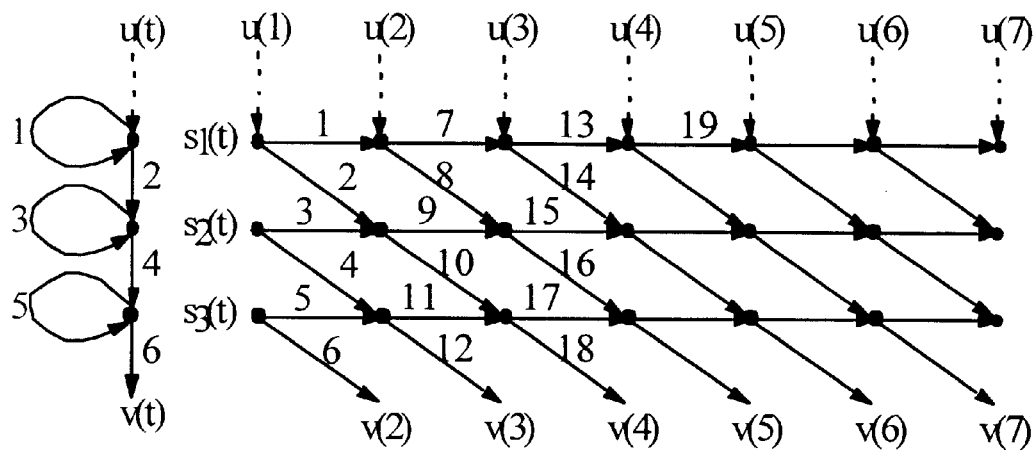

FIGS. 17, 18—The Viterbi Algorithm, and A Trellis of an HMM

Given a set of HMMs, which will be assumed to be modelling allophones, a lexicon, and an utterance, it is necessary to determine the likelihood of the utterance matching an entry in the lexicon. This likelihood will be used to train the models and, during recognition, the lexical entry with the maximum likelihood will be the recognizer's choice for what the utterance is. The Viterbi algorithm is a dynamic programming algorithm originally applied to operations research, and since applied nearly everywhere else (refer to Rabiner 1989 for more details). Basically, the set of HMMs and the lexicon (for recognition) or transcription (for training) are transformed into a trellis. The Viterbi algorithm finds the most likely path through the trellis.

As an example of the Viterbi algorithm, consider an utterance, which consists of the series of observations, $O = \{o_1, o_2, \ldots, o_T\}$. The observations are the cepstral vectors determined by the feature extraction step. As well, to simplify the example, only a single HMM is considered. Recall that an HMM is represented by a series of states connected by transitions. The trellis is simply another representation of the HMM, where a copy of the states is placed at each time, and the transitions go from one state at time t to another state at time t+1 (see FIG. 17).

Finding the Best State Sequence

Basically, the Viterbi algorithm finds the state sequence, or path, through the trellis that best corresponds to the observation O. For each state at each time, the likelihood of the best path arriving at that state at that time is maintained. To see how this is done, suppose that the algorithm has been applied up to time t−1. Let S(i, t) be the likelihood, or score, of the best path arriving at state i at time t. It is computed by finding $$S(i, t) = \max_j [p_{ij} S(j, t-1) P(o_t | j, i)], \quad \text{(EQ. 8)}$$

where $P(o_t|j,i)$ is the probability of the observation at time t, $o_t$, given the transition going from state j to state i, which is the likelihood defined by Equation 2, and $p_{ji}$ is the transition probability from state j to state i. The best state sequence is defined as the path that has the best score at time T, and usually ends in the terminal state of the HMM (by assumption).

Solving the Underflow Problem

A practical problem of directly applying Equation 8 is that the scores are likely to be extremely small numbers, and get smaller as T becomes larger. This results in serious numerical underflow problems. The simplest solution is to retain $\ln S(i,t)$ instead of $S(i,t)$. This is very convenient for the computation of the likelihoods, since the exponentiation is no longer necessary. Therefore, Equation 3 becomes $$\ln f_i(x) = -\frac{N}{2}\ln 2\pi - \frac{1}{2}\ln |C_i| - \frac{1}{2}(x - \underline{\mu}_i)^t C_i^{-1}(x - \underline{\mu}_i) \quad \text{(EQ. 9)}$$

(where the products are computed using the rotations as in Equation 7).

The Viterbi Approximation for Mixture Distributions

Logarithms solve the underflow problem, but introduce a new problem, involving the calculation of the logarithm of a sum. Let J be the value of j that satisfies the max in Equation 8. Then, using logarithms, $$\ln S(i,t) = \ln S(J, t-1) + \ln P(o_t|J,i) + \ln p_{Ji} \quad \text{(EQ. 10)}$$

The problem is that, using Equation 2, $P(o_t|J,i) = \Sigma W_{J,m} f_{J,m}(o_t)$, since the observation densities are modelled by mixture distributions, but only $\ln f_{J,i}(o_t)$ is being computed. If there are only two terms, say $\ln p_1$ and $\ln p_2$, then the fastest and most numerically stable method of computing $\ln(p_1 + p_2)$ is to use $$\ln[p_1 + p_2] = \ln p_1 + \ln[1 + e^{\ln p_2 - \ln p_1}] \quad \text{(EQ. 11)}$$

The trick used in Equation 11 is appropriate for the addition of two components, but the number of mixture components is generally much larger than two. To solve this problem, an approximation is used:

$$\ln P(J, i) \approx \max_m [\ln w_{J,m} + \ln f_{J,m}(o_t)] \quad \text{(EQ. 12)}$$

based on the observation that if the mean of each mixture component is sufficiently far from the others, then $\ln P(J,i)$ will be dominated by the mixture component which is nearest to $o_t$, since $o_t$ will be in the tails of the distributions of the other mixture components. This turns out to be the case most of the time. Effectively, this approximation converts a single transition from state J to state i, with probability $p_{Ji}$, and a mixture distribution, to M parallel transitions from J to i, each with a transition probability $p_{Ji} w_{J,m}$, and a unimodal distribution.

The Block Viterbi Algorithm

Consider the trellis shown in FIG. 7. As described above with reference to finding the best state sequence, the Viterbi algorithm finds, for each state, $$s_1(t) = \max [u(t), s_1(t-1) + b_1(t)]$$

$$s_2(t) = \max [s(t-1) + b_2(t), s_2(t-1) + b_3(t)]$$

$$s_3(t) = \max [s_2(t-1) + b_4(t), s_3(t-1) + b_5(t)]$$

$$v(t) = s_3(t-1) + b_6(t) \quad \text{(EQ 13)}$$

where u(t) corresponds to the input scores to the HMM (the output scores of the previous HMM in the word model) between frames t and t+1, $b_i(t)$ is the score of transition I for frame t (determined above), and v(t) is the score at the output of the HMM between frames t and t+1.

The usual implementation of the Viterbi algorithm (referred to as the frame-synchronous Viterbi algorithm) is:

for each frame t
 for each HMM m
  apply Equation 13.

In other words, frame t is processed for every transition of every model before frame t+1 is processed.

The block Viterbi algorithm processes frames in blocks, simply by changing the order of the loop:

for each block b
for each HMM m
for each frame t in the current block b
apply Equation 13.

For each block, u is assumed to be available (for the inputs to the first HMMs, it is initialized appropriately, and for all other HMMs, the order of their processing ensures that it is available when it is required). Using u, the output scores for the HMM v are calculated for every frame of the block and passed to subsequent HMMs. At the beginning of the block, the trellis state values ( $s_1(t),s_2(t),s_3(t)$ ) are restored to the values they had at the end of the previous block. The vectors of scores, u and v, are called score buffers. The optimization of the block Viterbi algorithm is discussed further below.

The block size is typically 40. The advantage to the block version of the Viterbi algorithm is that it uses memory more efficiently, both in terms of speed of access and limiting the amount of memory required.

The Training Algorithm

Once the allophones have been chosen, models must be trained. There are several techniques that can be used to train models, all based on iterative approaches, where an initial estimate of the parameters of the models is progressively refined. Historically, the first method, referred to as the Baum-Welch algorithm, is a variant of the E-M algorithm (see Deller et al. 1993, Rabiner 1989). The method used here, which is less expensive in terms of computation than the Baum-Welch algorithm, is based on the Viterbi algorithm. Both of these methods are variants of maximum likelihood estimation (MLE), which means that they attempt to maximize the average likelihood of the training tokens, according to the model parameters. More recently, methods that attempt to maximize the discrimination between competing models have been considered, either by directly attempting to maximize the difference between the correct model and the other models, or by maximizing the mutual information (for example, see Normandin 1991).

Recognition

Recognition is also based on the Viterbi algorithm, but has a different set of challenges from training. Training of models is generally done off line, so that the constraints of speed and complexity are quite generous. For recognition, the constraints are much tighter, particularly for real applications. Applications use a Speech Recognition Processor (SRP), which may use six CPUs to perform the recognition. The SRP has only a finite amount of memory, which places constraints on the number of parameters (basically, the number of means and, to some degree, the number of models) in the model set. As well, the typical specification for processing delay is that the recognition must be "real-time plus half a second," which means that the recognition must be complete no more than half a second after the end of the utterance (ideally, the end of the utterance is where the person stops speaking).

As well as operating under strict constraints of memory and time, recognition must also be more robust than training. Typically, people using speech applications will make errors and say things that are not in the vocabulary of the recognizer. For real applications, it is necessary to detect these circumstances, as well as the cases where recognizer is itself in error. The process of detecting such conditions is called rejection.

The Basic Recognition Algorithm

As mentioned above, the recognition algorithm is based on the Viterbi algorithm. It consists of two steps. The first, called the fast-match, is, as its name implies, a first fast pass through the utterance, which returns several choices (typically on the order of 20 to 30) that are most likely to include what the person has said. The second step, called rescoring, performs a more expensive algorithm on each of the choices returned by the fast-match. The top choice after rescoring is what is returned by the recognizer as being what the person has said. As well, for rejection, it is necessary to have a second choice, to compare to the first. The idea of the second choice is that if it is too close to the first choice, then there is not enough confidence in the recognition result, and it should be rejected.

Lexical Graphs

Typically, the recognition vocabulary, or lexicon, is a list of words or phrases, each of which has one or more transcriptions. Although the current technology is based on isolated word recognition, people often do not say the word or phrase in isolation. For example, for a directory assistance task, where the first step is to recognize the locality name, the person may not be sure of the locality, and so may say "Ah, Ottawa", or "Ah, Denver", instead of simply "Ottawa" or "Denver". As well, people also have a tendency to be polite, even to machines, so that they may say "Denver, please". To handle these cases, a limited word-spotting approach is used. An utterance is assumed to consist of an optional prefix, a core, and an optional suffix. The core is basically the desired recognition vocabulary (for the locality recognition, it would be one of the list of localities in the lexicon). Often, most of the utterances in an application can be modelled in this way, using a relatively small number of prefix and suffix entries.

To reduce the complexity of the recognition task, each part of the lexicon is specified by a graph. For example, the supported prefixes might be Ah
Ah, For
For
In
It's in
Ah, in
Ah, it's in There is a large amount of overlap between the entries, and merging them into a lexical graph will result in a smaller task.

Each branch on a lexical graph represents a sequence of one or more models, which means that each branch also has a trellis, formed by the states of each model on the branch. Therefore, the lexical graph has a large trellis, which is constructed by connecting the trellises for each branch together.

Figure 19:
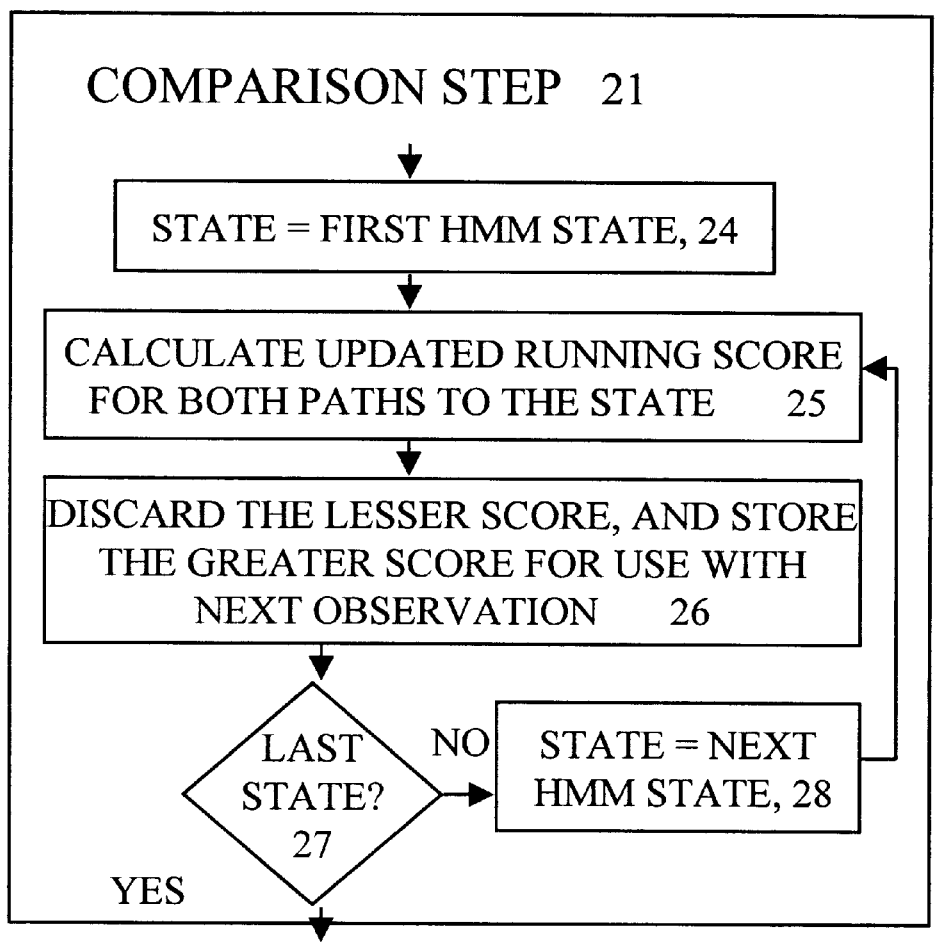
FIG. 19 shows in schematic form the comparison step of FIG. 15.

FIG. 19, Comparison

FIG. 19 shows in more detail the comparison step, in which matching scores for paths are determined. At 24, the first state in the model is identified. At 25, an updated running score is calculated, for each of the paths to the state. (As explained above, there would be two paths to each state other than the first state, as shown in FIG. 18.) The running score is determined as described earlier. The preceding running score for the given path is retrieved from memory, and a transition probability factor retrieved, and the updated running score calculated from these and from the Mahalanobis distance for this transition, retrieved from the pre-calculated table. The same procedure is then carried out for the second path to the state, and the lesser of the two updated running scores is discarded, while the remaining score is stored for later use in calculating succeeding running scores. At 27 and 28, the procedure is repeated for further states in the model, for the given observation.

Figure 20:
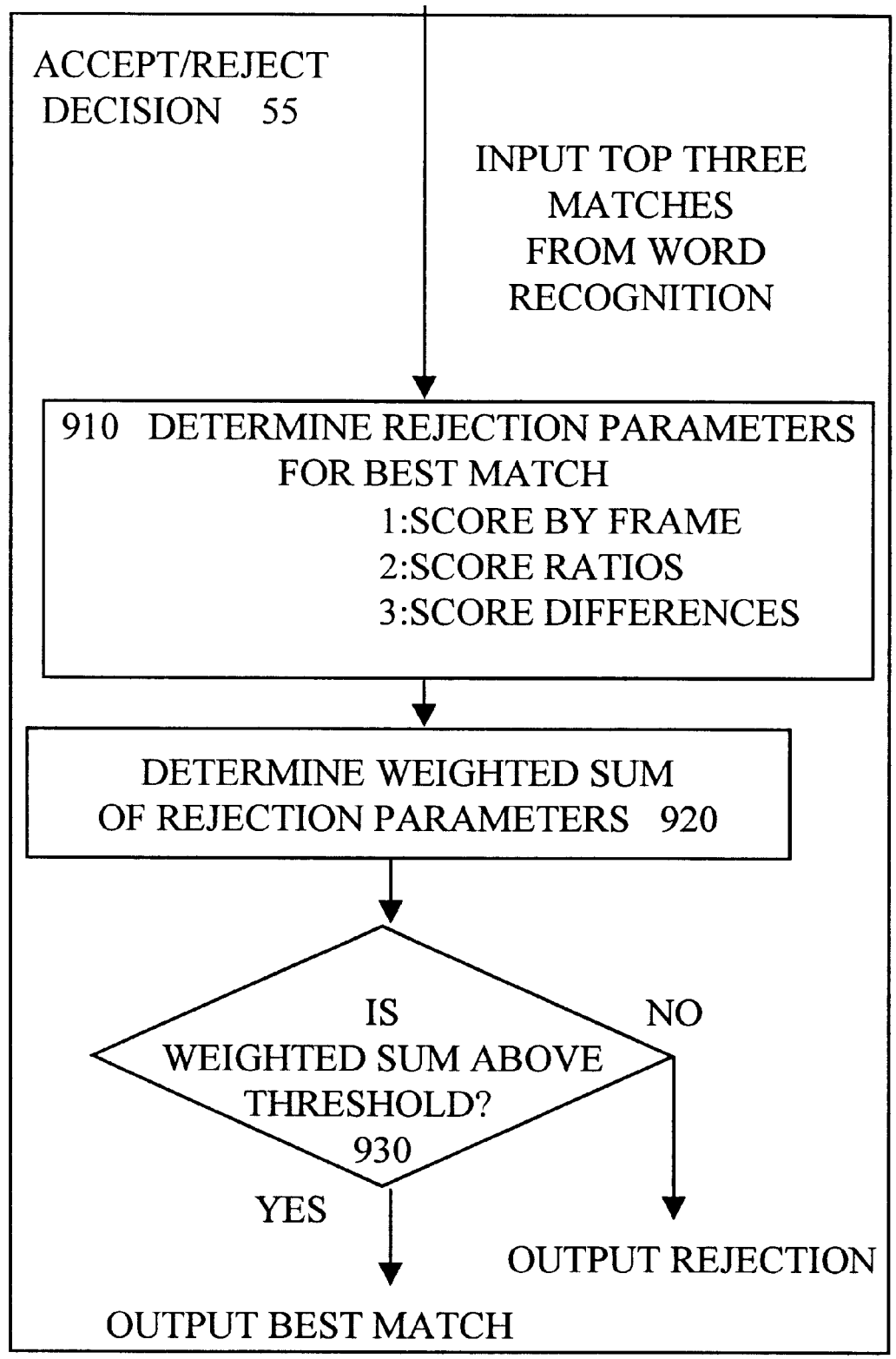
FIG. 20 shows in schematic form the accept/reject decision step of FIG. 14.

FIG. 20—The Accept/Reject Decision

FIG. 20 shows in more detail the accept/reject decision function of FIG. 1 or FIG. 14. Preferably, the top three matches from the preceding word recognition stage are passed to the accept/reject decision stage. At 910, rejection parameters are determined for the best match. Typical parameters might include the score per frame computed by dividing the accumulated likelihoods of the frames by the number of frames. Score ratio is another parameter. This can include the ratios of the first to second choices, and first to third choices. It is typically the most important of the parameters. The third parameter could be duration, comparing the duration of the word with the model in the dictionary.

At 920, a weighted sum of rejection parameters is obtained. The weighting can be trained in a similar manner to the training of the models in the dictionary, using training sets and adjusting the weights according to whether the output is correct or incorrect.

930 shows the thresholding step to determine whether to output a best match or whether to output an indication of rejection of all the matches, according to whether the weighted sum is above a threshold. The threshold can be chosen from experience by choosing a value which gives an acceptable performance for the application or applications which will use the process.

Figure 21:
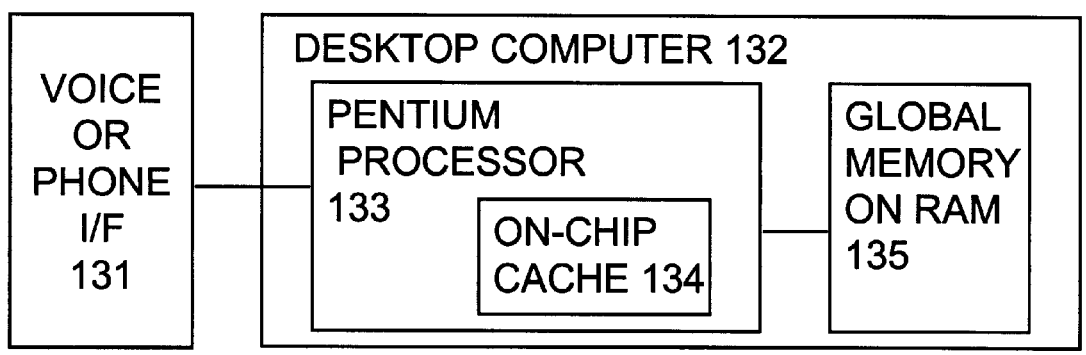
FIG. 21 shows hardware elements for a voice processing platform according to another embodiment of the invention.

FIG. 21—Alternative Hardware Arrangement

FIG. 21 shows an alternative hardware configuration for carrying out the steps of FIG. 1 or FIG. 14. A desktop computer 132 is connected directly to a voice input such as a microphone or an interface to a telephone line as illustrated at 131. The desktop computer includes a Pentium processor 133 which includes an on-chip cache 134. The cache may include fast memory provided external to the processor. Global memory would be provided by RAM 135. Such an arrangement could be used to carry out some or all of the steps shown in FIG. 1 or 14. Clearly, the computer could be linked to other computers to share the tasks, and perhaps speed the processing.

Other Variations

Although the examples described above make use of a finite state machine model and viterbi recognition algorithm, for the test recognition, clearly other methods could be used. Although the examples described above make use of non-vocabulary utterances in the training audio signal, it would be conceivable to have no non-vocabulary utterances in the training audio signal. Although the examples described above make use of random combinations of allophones to generate the decoys, it would be conceivable to generate the decoys more systematically.

Although the examples described above make use of a separate set of allophone models for the decoys, so that simpler models can be used, than those used for the vocabulary words, it would be conceivable to use the same set of allophone models. Although the examples described above make use of the decoy scores by selecting the best decoys, it would be quite possible to make use of the scores as a weighting factor in the recognition.

For more details of these and other ways of implementing embodiments of the invention, reference is made to the documents listed below.

Other variations will be apparent to persons of average skill in the art, within the scope of the claims, and are not intended to be excluded.

REFERENCES

Deller, J. R., Proakis, J. G., and Hansen, J. H. L. (1993) Discrete-time processing of speech signals. Macmillan Publishing.

Ladefoged, P. (1993) A course in phonetics, 3rd ed. Harcourt Brace Jovanovich.

Normandin, Y. (1991) Hidden Markov models, maximum mutual information estimation, and the speech recognition problem. Ph.D. thesis, McGill University.

O'Shaughnessy, D. (1990) Speech Communication: Human and Machine. Addison-Wesley. Addison-Wesley Series in Electrical Engineering: Digital Signal Processing.

Rabiner, L. R. (1989) A tutorial on hidden Markov models and selected applications in speech recognition, Proceedings of the IEEE, Vol. 77, No.2, February, pp. 257–285.

Sharp, D., et al. (1992) Speech recognition research. BNR TL92-1062.

Wilpon, J. G., and Rabiner, L. R. (1985) A modified k-means clustering algorithm for use in isolated word recognition, IEEE Transactions on Acoustics, Speech, and Signal Processing, 3:587–594.

What is claimed is:

1. A method of assessing decoys for use in an audio recognition process for identifying predetermined sounds in an unknown input audio signal, the method comprising the steps of:

carrying out a test recognition process by matching known training audio signals to models representing the predetermined sounds and the decoys; and determining for each of the decoys, from the results of the test recognition process, a score representing the effect of the respective decoy in the recognition of any of the known training audio signals, wherein the known training audio signals comprise known non-vocabulary utterances, and the score additionally represents the effect of the respective decoy on the rejection of any of the non-vocabulary utterances.

2. The method of claim 1 further comprising the preliminary step of generating at least some of the decoys from a random combination of component sounds.

3. The method of claim 1 further comprising the steps of determining for the respective decoy, further scores relating to further ones of the known training audio signals, and determining an accumulated score from the score, and the further scores.

4. The method of claim 1 further comprising the step of selecting which decoys to use according to the determined scores.

5. The method of claim 1 wherein the audio recognition process comprises a speech recognition process, and the predetermined sounds comprise words.

6. The method of claim 1 wherein the step of determining the score comprises the steps of:

determining whether the respective decoy is a closer match to a given one of the known training audio signals than the best matching predetermined sound; and determining the score according to the result.

7. The method of claim 6 wherein the step of determining the score comprises the steps of:

determining how many other decoys are a closer match to the given one of the known training audio signals than the best matching predetermined sound; and determining the score according to the result.

8. The method of claim 6 wherein the step of determining the score comprises the steps of:

determining how close a match the respective decoy is relative to any other decoys which are a closer match to the given one of the known training audio signals than the best matching predetermined sound; and determining the score according to the result.

9. A method of audio recognition for identifying predetermined sounds in an unknown input audio signal, using decoys having associated scores determined by carrying out a trial recognition process by matching known training audio signals to models representing the predetermined sounds and the decoys, the scores representing the effect of a respective decoy in the recognition of any of the known training audio signals, the method comprising the step of:

performing the audio recognition process for identifying predetermined sounds in an unknown input audio signal by matching the unknown input audio signal to models of the predetermined sounds and the decoys, according to the scores associated with the decoys, wherein the matching is carried out using decoys weighted according to their score.

* * * * *